UNITED STATES PATENT OFFICE.

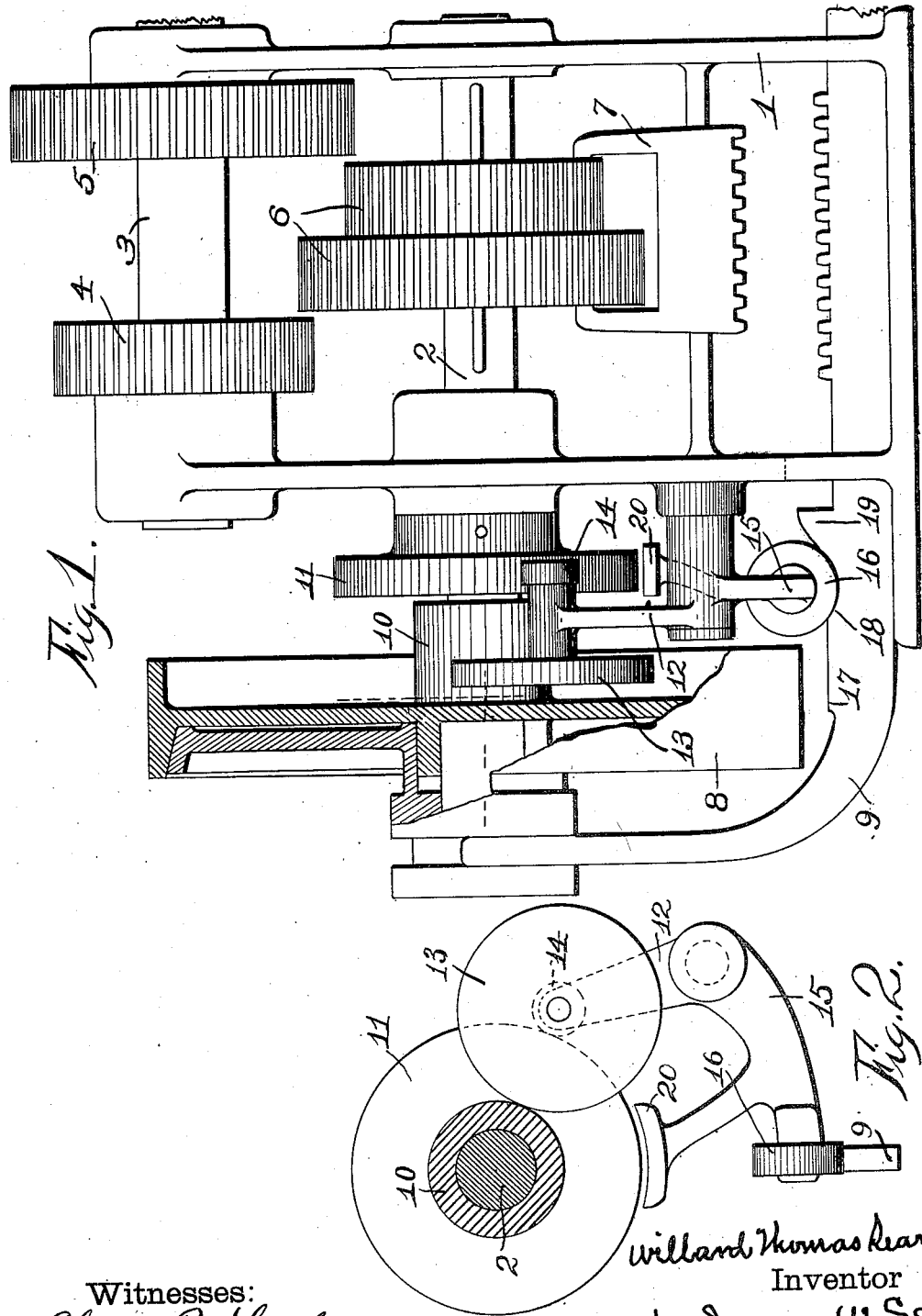

WILLARD THOMAS SEARS, OF PHILADELPHIA, PENNSYLVANIA, ASSIGNOR TO NILES-BEMENT-POND COMPANY, OF JERSEY CITY, NEW JERSEY.

POWER-TRANSMISSION DEVICE.

No. 844,546.    Specification of Letters Patent.    Patented Feb. 19, 1907.

Application filed October 4, 1906. Serial No. 337,343.

*To all whom it may concern:*

Be it known that I, WILLARD THOMAS SEARS, a citizen of the United States, residing at Philadelphia, Philadelphia county, Pennsylvania, have invented certain new and useful Improvements in Power-Transmission Devices, of which the following is a specification.

This invention pertains to apparatus for the transmission of power in which are involved relatively shifting toothed members for changing the rate of motion or the direction of motion or the condition from rest to motion, and vice versa, and relates to improved means for guarding against, first, the difficulties of intermeshing the teeth when teeth do not happen to match tooth-spaces; second, the liability of the transmission of heavy work through teeth but partially engaged, and, third, the labor of shifting teeth into engagement while they are under the strain of heavy duty.

The invention will be readily understood from the following description, taken in connection with the accompanying drawings, in which—

Figure 1 is a front elevation of an apparatus embodying my invention; and Fig. 2 is a side elevation of the auxiliary driving mechanism, the hub of the main driving-pulley and the driving-shaft appearing in vertical transverse section.

In the drawings, 1 indicates housing parts; 2, the driving-shaft; 3, the driven shaft; 4, a gear fast on the driven shaft; 5 a second but larger gear fast on the driven shaft; 6, a pair of gears fast with each other and splined on the driving-shaft; 7, a shifter engaging the pair of splined gears and adapted to slide them, so that its component gears may mesh with either of the mating gears, respectively, on the driving-shaft; 8, a friction-clutch, which may be of any desired or suitable ordinary construction; 9, an endwise-movable bar to serve in engaging and disengaging the clutch; 10, a circular friction member carried by the revolving pulley of the friction-clutch, this friction member being in the illustration formed by the periphery of the hub of the pulley; 11, a friction-disk fast on the driving-shaft and of larger diameter than hub 10; 12, an arm rocking on a fixed pivot to and from friction members 10 and 11; 13, a friction-disk journaled on rocking arm 12 and adapted for peripheral engagement with hub 10; 14, a friction-disk smaller than disk 13 and fast with it and adapted for peripheral engagement with friction-disk 11; 15, a second arm fast with rocking arm 12; 16, a roller carried by arm 15 and engaging over the clutch-operating bar 9; 17, a track portion on bar 9 in position to pass under roller 16 and of such height that when it is under the roller the rocking structure will cause friction-disks 13 and 14 to clear friction-surfaces 10 and 11, respectively; 18, a depression in track 17 of such depth as to permit the rocker to carry the friction members into contact; 19, a cam-lug on track 17 of such height as to move the rocking structure farther than is necessary to relieve the contact of the friction-surfaces, and 20 a brake-shoe carried by the rocking structure and adapted to engage friction-disk 11 under the influence of cam 19.

Assume, first, that the friction-clutch is engaged, the driving-shaft in motion, and gears 6 in the neutral or disengaged position. Track portion 17 will be under the roller, and the friction members will be out of engagement with each other, and the brake-shoe will be free. If now an attempt be made to slide gears 6 into engagement with one of the driven gears, an opportunity would quickly present itself for tooth ends to enter tooth-spaces; but the instant this occurred the full power and speed would become transmitted to the driven gear, and heavy working duty would thus be imposed upon teeth engaged, perhaps, but a mere fraction of their length. This often breaks teeth and always results in the mutilation of the ends of the teeth, and in completing the engagement of the teeth considerable manual effort would be required in doing so, owing to the teeth being under full working strain.

Assume, secondly, that the friction-clutch is disengaged, so that its pulley may run loosely on the driving-shaft, resulting in the driving-shaft being at rest, and assume that gears 6 are in neutral idle position and disregard for the present the auxiliary friction and brake devices. If an attempt be now made to slide gears 6 into engagement with one of the mating gears, the attempt may, and is quite apt to be, defeated by lack of register between tooth ends and tooth-spaces. One of the gears must be angularly adjusted before engagement can be initiated. Therefore, as will be seen, troubles which may be of serious character are quite likely to arise in engaging the teeth regardless of whether the sliding gear be rotating or at rest. My present improvement, involving the auxiliary friction device, obviates these difficulties.

Assume, again, as in the first case, that the friction-clutch is engaged, the driving-shaft and sliding gears in rotation, the friction-disks free of engagement, and the brake free. Recognizing the difficulties and possible risks of attempting to engage the gears under these conditions, we first throw the friction-clutch out of engagement, allowing the roller to drop into the depression 18. The release of the friction-clutch has cut off the power, and normally the driving-shaft and sliding gear would come to rest; but the dropping of the roller into the depression in the clutch-operating bar has brought friction-disks 13 and 14 into frictional driving contact with friction members 10 and 11, respectively, the result being that the loose rotating clutch-pulley 8 transmits motion at light power and low speed to the driving-shaft and to the sliding gear. While the sliding gear is thus in slow rotation, an attempt may be made to shift it into engagement with one of the mating gears. If its teeth fail to enter tooth-spaces, the opportunity for entering will quickly present itself, and the instant the engagement has been initiated then the driving-shaft and sliding gears cease rotation, as the auxiliary friction arrangement has not the power to overcome the resistance represented by the driven shaft. Under these conditions the engagement of the teeth may be completed with perfect safety and with trifling effort, and when the engagement is complete then the friction-clutch may be thrown into engagement, thus putting on the full power and releasing the auxiliary friction arrangement. Similarly, when the teeth are to be disengaged instead of the act requiring an effort corresponding with the transmission of full power through the teeth and with danger of transmitting full power through but partially-engaged teeth the friction-clutch may be first disengaged and then the teeth disengaged while the gearing is at rest, the driving-shaft and sliding gears taking up very slow rotation as soon as the disengagement shall have been completed.

In some cases it may be desirable to positively arrest the motion of the gears, whether engaged or disengaged, and in such case it is only necessary after disengaging the friction-clutch to move the clutch-operating bar somewhat farther, and thus cause lug 19 to apply the brake-shoe to the friction-disk on the driving-shaft.

The difficulties and dangers which have been pointed out as incident to the employment of sliding toothed gears in transmission devices have long been recognized as present in most every character of transmission device involving toothed members of one form or another to be engaged and disengaged, and it is thought that the present invention becomes of availability in connection with most any such shifting tooth device. Any usual or suitable means may be employed for actuating the shifter and the clutch-operating bar.

I claim—

1. Power-transmission apparatus comprising a pair of toothed members, means for shifting one of said members into and out of engagement with the other, a rotary driving device for transmitting the power to and through the toothed members when engaged, means for connecting and disconnecting said rotary driving device to and from one of said toothed members, friction transmission-gearing disposed between said rotary driving member and one of said toothed members, and means for throwing said friction-gearing into and out of action, combined substantially as set forth.

2. Power-transmission apparatus comprising a pair of toothed members, means for shifting one of said members into and out of engagement with the other, a rotary driving device for transmitting the power to and through the toothed members when engaged, means for connecting and disconnecting said rotary driving device to and from one of said toothed members, friction transmission-gearing disposed between said rotary driving member and one of said toothed members and arranged to transmit motion to one of said toothed members at abnormally low speed, and means for throwing said friction-gearing into and out of action, combined substantially as set forth.

3. Power-transmission apparatus comprising a pair of toothed members, means for shifting one of said members into and out of engagement with the other, a rotary driving device for transmitting the power to and through the toothed members when engaged, means for connecting and disconnecting said rotary driving device to and from one of said toothed members, friction transmission-gearing disposed between said rotary driving member and one of said toothed members, means for throwing said friction-gearing into and out of action, and a friction-brake coöperating with said toothed member and with said friction-gearing and arranged to be put into action when the friction-gearing is thrown out of action, combined substantially as set forth.

WILLARD THOMAS SEARS.

Witnesses:
ARCHIBALD M. O'BRIEN,
SAMUEL C. KANE.